United States Patent
Chembakassery Rajendran et al.

(10) Patent No.: US 12,106,568 B2
(45) Date of Patent: Oct. 1, 2024

(54) METHOD AND SYSTEM FOR CROWD COUNTING

(71) Applicant: Tyco Fire & Security GmbH, Neuhausen am Rheinfall (CH)

(72) Inventors: Deepak Chembakassery Rajendran, Kerala (IN); Rajkiran Kumar Gottumukkal, Bangalore (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 306 days.

(21) Appl. No.: 17/677,346

(22) Filed: Feb. 22, 2022

(65) Prior Publication Data
US 2023/0267742 A1    Aug. 24, 2023

(51) Int. Cl.
G06T 7/73 (2017.01)
G06N 3/045 (2023.01)
G06V 20/40 (2022.01)
G06V 20/52 (2022.01)

(52) U.S. Cl.
CPC ............. *G06V 20/52* (2022.01); *G06N 3/045* (2023.01); *G06T 7/73* (2017.01); *G06V 20/44* (2022.01); *G06T 2207/20081* (2013.01); *G06T 2207/20084* (2013.01); *G06T 2207/30242* (2013.01)

(58) Field of Classification Search
CPC ........ G06V 20/52; G06V 20/44; G06V 10/82; G06V 10/766; G06N 3/045; G06T 7/73; G06T 2207/20081; G06T 2207/20084; G06T 2207/30242; G06F 18/27
See application file for complete search history.

(56) References Cited

U.S. PATENT DOCUMENTS

| | | | |
|---|---|---|---|
| 2021/0358632 A1* | 11/2021 | Fazio | G06F 16/5854 |
| 2022/0122243 A1* | 4/2022 | Fitzgerald | G06V 10/25 |
| 2022/0374970 A1* | 11/2022 | Bronicki | G06Q 30/0643 |
| 2023/0281946 A1* | 9/2023 | Celi | G06V 10/765 |
| | | | 382/103 |

OTHER PUBLICATIONS

Hossain et al., "Crowd Counting Using Scale-Aware Attention Networks," 2019 IEEE Winter Conference on Application of Computer Vision, Jan. 2019, pp. 1280-1288.
International Search Report and Written Opinion in PCT/US2023/062214, mailed Apr. 13, 2023, 17 pages.
Kumagai et al., "Mixture of Counting CNNs: Adaptive Integration of CNNs Specialized to Specific Appearance for Crowd Counting," arXiv:1703.09393v1 [cs.CV], Mar. 2017, pp. 1-8.

(Continued)

*Primary Examiner* — Chuong A Ngo
(74) *Attorney, Agent, or Firm* — ARENTFOX SCHIFF LLP

(57) ABSTRACT

A method for counting number of people in an image includes feeding an image into an object counting model to generate a first result for the image that is indicative of a number of human heads detected in one or more regions of the image. The image is fed into a regression model to generate a second result for the image that is indicative of a regression count of people detected in the one or more regions of the image. An estimate of people detected in the image is obtained based on the first result and the second result using one or more rules.

14 Claims, 7 Drawing Sheets

(56) References Cited

OTHER PUBLICATIONS

Shami et al., "People Counting in Dense Crowd Images Using Sparse Head Detections," IEEE Transactions on Circuits and Systems for Video Technology, Sep. 2019, vol. 29, No. 9, pp. 2627-2636.
Sindagi et al., "CNN-Based cascaded multi-task learning of high-level prior and density estimation for crowd counting," International Conference on Advanced Video and Signal Based Surveillance, Aug. 2017, pp. 1-6.
Wang et al., "Crowd Counting with Density Adaptation Networks," arXiv:1806.10040v1 [cs.CV], Jun. 2018, pp. 1-5.
Wang et al., "Global Context Instructive Network for Extreme Crowd Counting," IEEE Access, Feb. 2020, vol. 8, pp. 34265-34275.

* cited by examiner

METHOD AND SYSTEM FOR CROWD COUNTING

TECHNICAL FIELD

The present disclosure generally relates to image processing, and more specifically, to methods and systems for crowd counting via image processing.

BACKGROUND

Determining the number of members in a crowd is a difficult problem. Manual methods are exceedingly costly and are generally too slow. Previous attempts to use a processor have suffered from scalability and accuracy problems.

With the increasing use of video surveillance and monitoring in public areas to improve safety and/or security, techniques for analyzing such videos are becoming increasingly important. There are various techniques that are utilized or have been proposed for video analysis. The current generation of (closed-circuit television) CCTV systems are primarily visual aids for a control operator who then analyzes the video for unusual patterns of activity and takes specific control actions. However, as the number of deployed cameras increase, monitoring all the video streams simultaneously becomes increasingly difficult and the likelihood of missing significant events of interest is quite high. Therefore, automated video analysis using Computer Vision techniques is of interest.

Video imagery based crowd density estimation in public spaces can be a highly effective tool for establishing global situational awareness. Counting by regression deliberately avoids actual segregation of individual or tracking of features but estimates the crowd density based on holistic and collective description of crowd patterns. Since neither explicit segmentation nor tracking of individuals are involved, counting by regression becomes a highly practical method for crowded environments where detection and tracking are severely limited intrinsically.

Conventional apparatus and methods based on counting by regression require a user to provide a large amount of annotated samples, e.g., dotted annotations on head or pedestrian positions in hundreds of frames, to train the system. This requirement of exhaustive supervision is not practical given a complex scene and a large number of cameras.

There remains a need in the field to practically and efficiently count number of people in an image.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In accordance with one aspect, there is provided a method for counting number of people in an image. Advantageously, the disclosed method combines head detection, person detection and density estimation methods to get an accurate estimate of people in the scene based on local context of the crowd. It should be noted that the disclosed method employs local crowd aware Convolutional Neural Network (CNN) regression methods to estimate the crowd count.

One example implementation relates to a method for counting number of people in an image. One aspect of the method includes feeding an image into an object counting model to generate a first result for the image that is indicative of a number of human heads detected in one or more regions of the image. The image is fed into a regression model to generate a second result for the image that is indicative of a regression count of people detected in the one or more regions of the image. An estimate of people detected in the image is obtained based on the first result and the second result using one or more rules.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
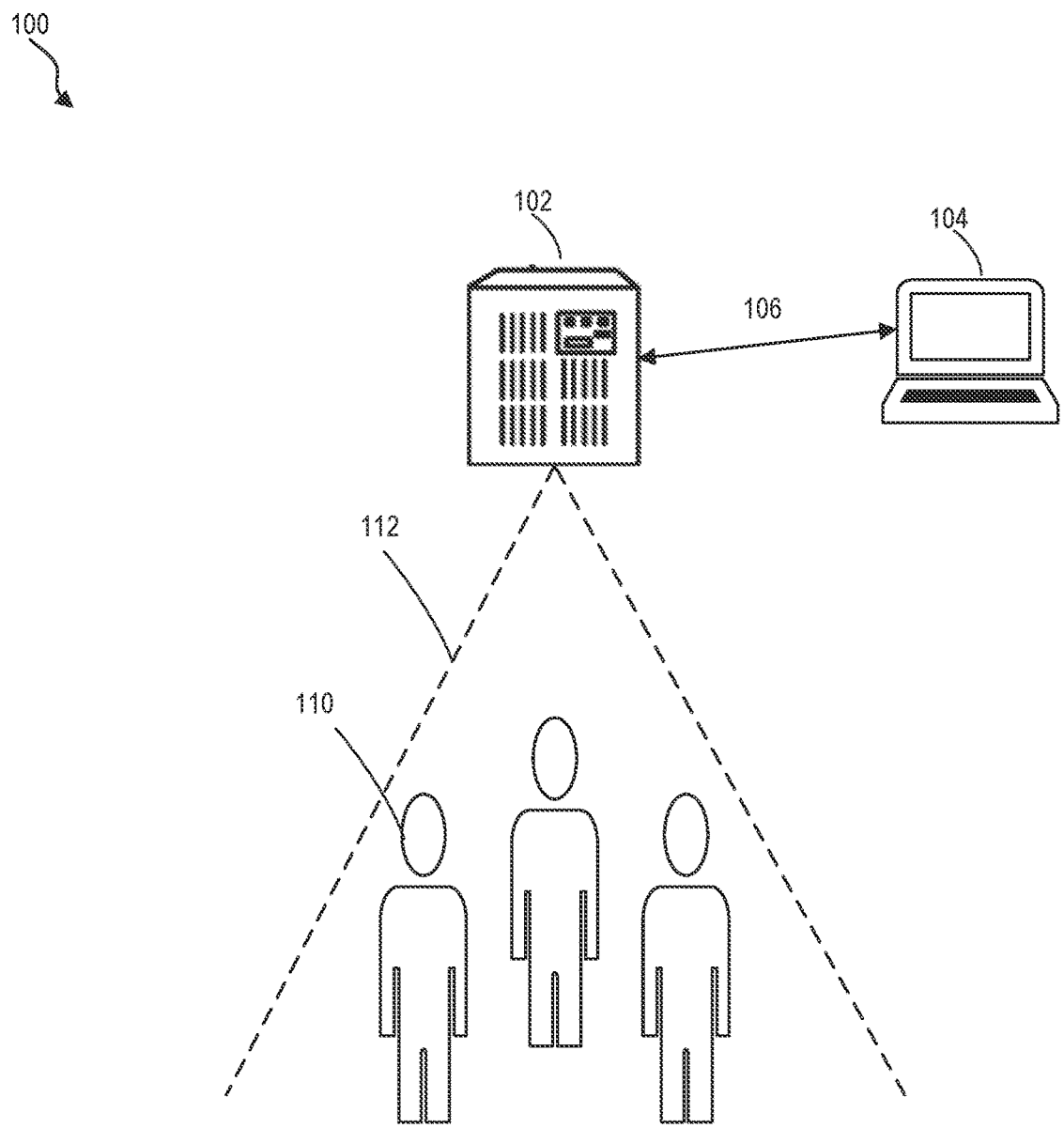
FIG. 1 is an example of a block diagram of a deployed crowd-counting system, in accordance with aspects of the present invention.

FIG. 1 is an example of a block diagram of a deployed crowd-counting system, in accordance with aspects of the present invention. In FIG. 1 the deployed crowd-counting system comprises a video analytic system 100, which includes local sensing device 102, server 104, and communication link 106. In the implementation shown in FIG. 1, local sensing device 102 is mounted to look down at a particular area (e.g., a top view). In other aspects, however, local sensing device 102 may be positioned to provide image data at different orientations.

Local sensing device 102 may be configured to capture a plurality of different types of data, including image data, audio data, depth stream data, and/or combinations thereof. That is, local sensing device 102 may include a camera (e.g., a security camera) with functionality of monitoring the surroundings, a depth stream sensor, and/or a microphone for capturing audio data. In addition, other types of sensors may be utilized depending on the application. In particular, video analytic system 100 may rely on a depth stream sensor to capture depth stream information with respect to the area being monitored.

In the exemplary implementation shown in FIG. 1, local sensing device 102 may be configured to communicate with server 104 via communication link 106. Depending on the application requirements, communication may be wired or wireless. In one aspect, local sensing device 102 may provide raw (unprocessed) sensor data to server 104 for processing by a video analytic system. In other aspects, local sensing device 102 may include a local processor for providing local processing of the raw sensor data. A benefit of the latter approach is that the bandwidth associated with communication channel 106 may be less than that required for transfer of raw sensor data. In particular, rather than communicating raw sensor data, local sensing device 102 may only be required to communicate the results of the locally performed analysis (e.g., number of people, events detected, etc.). In addition to requiring less bandwidth, privacy may be improved by preventing communication of raw data across communication channel 106 and thereby preventing possible theft of the data en route to server 104.

Based on the collected sensor data, video analytics-whether executed locally or remotely-processes the data to identify and count individuals 110 within the field of view 112 of local sensing device 102. In addition, the video analytic system 100 may generate a plurality of metrics or values associated with the processed sensor data, such as count of people in a particular location, average number of people, average height, and the like. FIGS. 2-5 illustrate various steps/functions performed by the video analytic system 100 to generate the desired metrics.

Figure 2:
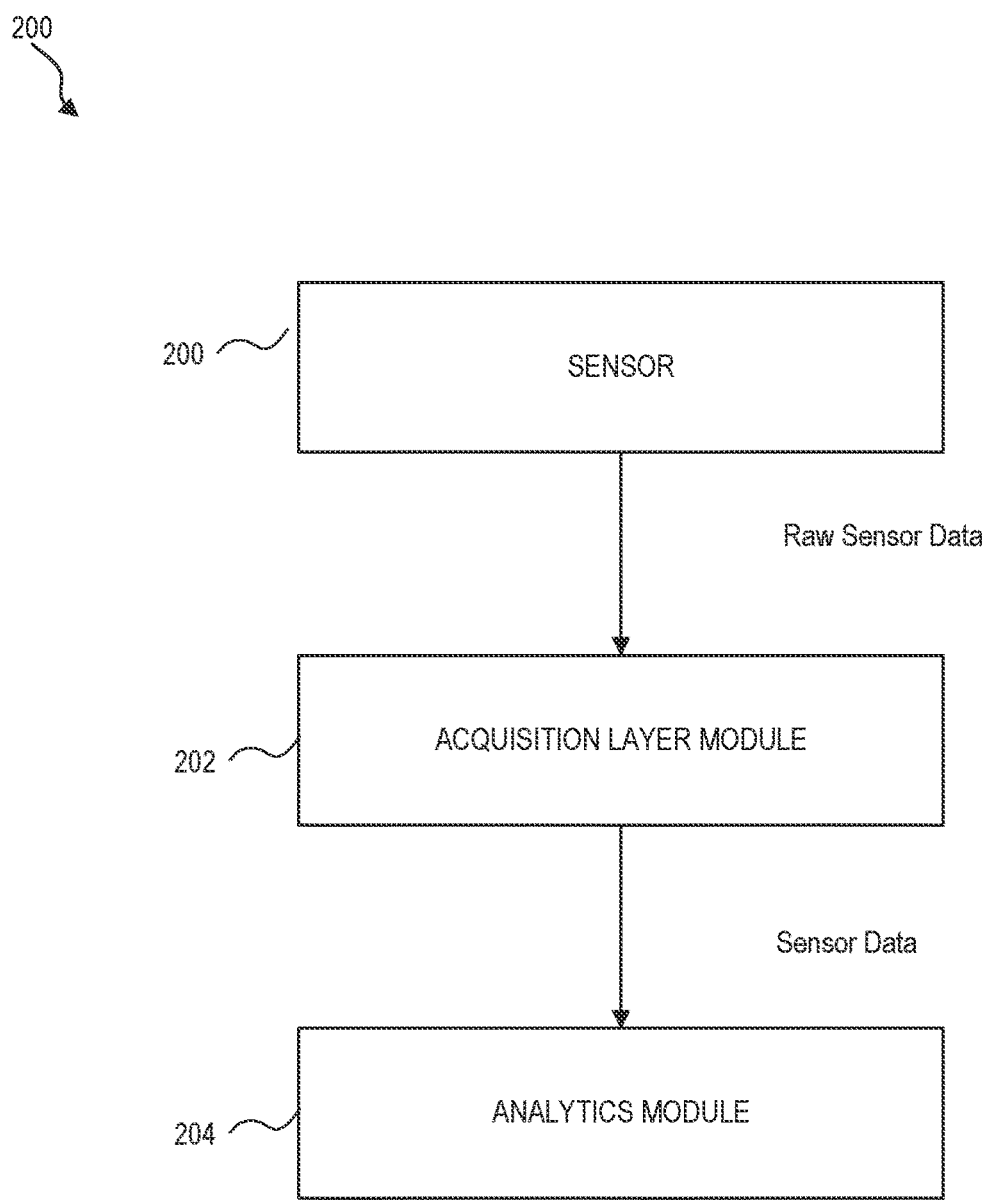
FIG. 2 is an example of a block diagram of components and modules included in the crowd-counting system, in accordance with aspects of the present disclosure.

FIG. 2 is a block diagram of components and modules included in the crowd-counting system, in accordance with aspects of the present disclosure. As described above, in other aspects one or more of these components may be included remotely at server 104 (shown in FIG. 1). In the implementation shown in FIG. 2, local sensing device 102 may include sensor 200, acquisition module 202, and analytics module 204.

Sensor 200 may include one or more sensing devices. In the implementation shown in FIG. 2, sensor 200 may be a camera (e.g., a security camera) capable of monitoring the surroundings and, as described above, in other aspects may include additional sensor types such as an infrared sensor, for example. Acquisition layer module 202 may receive the raw image data provided by the sensor 200 and may convert the raw image data—in whatever format the image is received—into a generic format.

Analytics module 204 may receive the generic format of the stream data generated by the acquisition layer module 202 and, in response, may detect events and/or generate one or more outputs. Depending on the application, different types of events may be detected and/or outputs generated. For example, in one aspect, a count of people in a particular image may be desirable. The analytics module 204 may combine head detection, person detection and density estimation methods to get an accurate estimate of people in the scene based on local context of the crowd. The analytics module 204 may use different algorithm on different parts of the image based on the crowd present in that region. In addition, other outputs may be useful, such as the average number of people moving through the field of view of sensor 200 during a period of time, average height of people, and the like.

There are many methods in which object forms are segmented from the images, and objects are counted and/or measured. Such methods may be used to count the number of people in the image, such as, but not limited to, counting by person detection, counting by head detection and counting based on density estimation techniques. However, the aforementioned methods try to address scenarios of specific crowd density.

Crowd counting method that employs person body detection typically fails when crowd density is high, as full visibility of the person's body in the image is hidden due to occlusion. On the other hand, the head detection counting, based on images captured from one or more image capture devices, usually performs well on a medium crowd scenarios. Even when the body of a person may be occluded, the head region may be visible in the image. In very densely crowded scenarios even the head region may not be fully visible and counting based on head detection may fail as well. Due to aforementioned occlusion issues, regression methods may be applied to estimate the count of people. Unlike previous approaches, regression methods may be trained using a point on the head as the GT (ground truth) for each person. Accordingly, regression models may handle the low visibility of people when compared to the previous approaches.

One of the drawbacks of the regression model is that model training uses only a few pixels on the head. Accordingly, there is a possibility that at least one other region near the head can be treated as the person's head region by mistake during inference. Also, the differentiating power of the regression model between human head and other animal heads, as well as background noise are not good as compared to the aforementioned head/person detection methods. However, when the crowd is small or sparse, counting based on the person body detection model is more reliable than regression and head detection based models. On a medium-sized crowd, head detection based models are more reliable as compared with the other models. The crowd in an image may have spatially varying sparsity and density. Also, within an image there can be areas with a very high dense region of the crowd and a very sparse region of the crowd. Accordingly, the handling of these areas with the same model of people detection typically underperforms as compared to a model which may utilize all the properties of the crowd and person features available in the image.

In other words, density estimation models are successful at counting people when there is dense crowd but may fail to count correctly when the crowd is sparse. On the other hand, head/person based detection models may work well on sparsely crowded images and may not work as well on densely crowded images. In an aspect, the analytics module 204 may employ an efficient local context-aware crowd counting algorithm that may use a combination of object detection (e.g., person based, head based), and density estimation models. In an aspect, the analytics module 204 may partition an image into two or more sub-regions and may employ the sub-regions of the images to determine which model (head based detection/person based detection/ density estimation model) is suitable to compute the crowd count in that sub-region. On every sub-region of the image, the analytics module 204 may employ different deep learning/recognition models based on the crowd density variation (e.g., based on the learned crowd context). The analytics module 204 may employ either rule based or CNN based regression target detection framework to adaptively find count from sub-regions and thusly may estimate the total crowd count.

Figure 3:
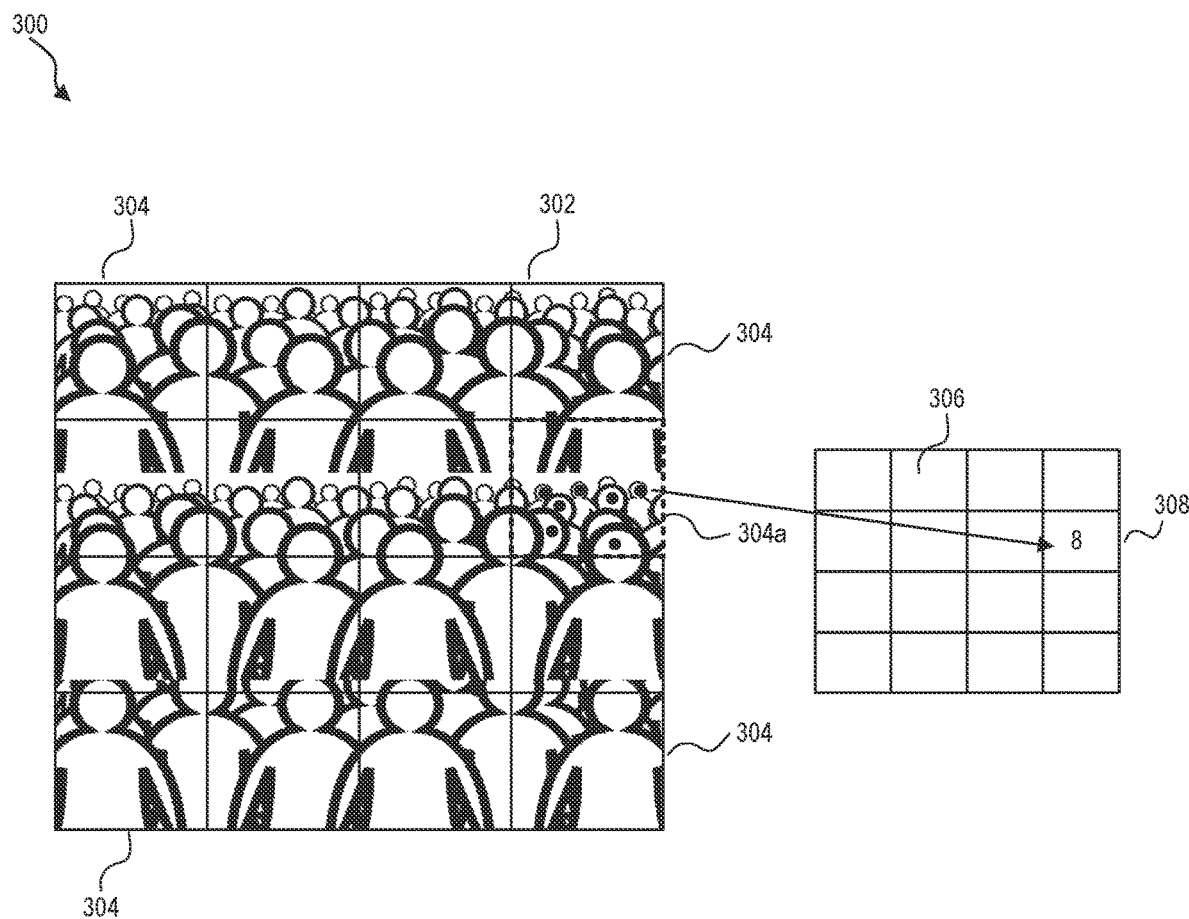
FIG. 3 is an example of a heat map generated in accordance with aspects of the present disclosure.

FIG. 3 is an example of a heat map generated in accordance with aspects of the present disclosure. As noted above, the analytics module 204 may employ a combination of models to handle images of complex and crowded situations (both dense and sparsely crowded scenes). In an aspect, the combination of models may include at least one regression model. In an aspect, the regression model may be trained on heat map data obtained from Bayesian density estimation model, person detection model and a head detection model. Density estimation model may also be referred to as non-parametric estimation, and the density estimation model does not necessarily need to be aware of data distribution. As shown in FIG. 3, the analytics module 204 may partition the image 302 provided by the acquisition module 202 into a plurality of sub-regions 304. In a non-limiting example, the size of the input image 302 may be 128×128 pixels.

Accordingly, the analytics module 204 may partition the input image 302 into 16 sub-regions 304 having the size of 32×32 pixels. In FIG. 3, each sub-region 304 contains a count value of the people in that sub-region 304 and optionally other similar metrics. A heat map may be drawn based on this information. The heat map 306 may be composed of a people count value, and can reflect a density degree of a specified sub-region 304 by using a color brightness or other contrasting visual representation. Sum of the elements in the heat map 306 may represent total count obtained from that detection/estimation model (e.g., density estimation model, person detection model and a head detection model). In other words, the analytics module 204 may extract heat map from the employed CNN networks, namely, a person detection CNN network, head detection CNN network and density estimation-based CNN network, in such a way that each cell in the heat map represents the count of people in a particular autonomously segmented pixel sub-region 304 (for example, 32×32 pixels) of the input image 302. In an aspect, the analytics module 204 may generate the heat maps for head detection model and person detection model by mapping the output detections of the respective model.

For the regression-based CNN network model, the analytics module 204 may employ the last layer output of the backbone network. The backbone network refers to the network which takes as input the image and extracts the feature map upon which the rest of the network is based. Certain aspects may train the analytics module 204 on a single image using integrated localization information through joint multi-model learning to improve the performance and accuracy of end-to-end people counting. Each heat map 306 represents a corresponding people count in the sub-regions. In an aspect, the analytics module 204 may generate an image heat map 306 having one of the following size types: fixed size and variable size. If the fixed size is utilized, the analytics module 204 may divide the input image 302 into N×N sub-regions 304 irrespective of the size of the input image 302. If variable size is utilized (for example, if the input image 302 has non-rectangular effective picture area), each element of the heat map 306 may use count values representing detections from each M×M pixel sub-regions 304. In this case, the size of the heat map 306 may be dependent on the size of the input image 302. In an aspect, to identify optimal size of the sub-region 304, during training stage, the analytics module 204 may sequentially divide the input image 302 into sub-regions 304 of different size (i.e., first try sub-regions having size 4×4, next 8×8, then 32×32, 64×64, and the like) and compare the results (estimated counts) to a known accurate count of people to identify optimal size of the sub-region 304.

Still referring to FIG. 3, element 308 of the heat map 306 contains the count value for sub-region 304a for one of the aforementioned models. For example, the count value for the sub-region 304a obtained using the density estimation based model may be equal to 8, while count values for the same sub-region 304a in the heat maps 306 generated using the head detection model and person detection models may be equal to 7 and 4, respectively.

In an aspect, for each sub-region 304, that is, each time the analytics module 204 estimates a number of people in that sub-region, the analytics module 204 may apply one or more rules to identify a certain event in a particular image and/or video frame. In one non-limiting example, the analytics module 204 may use counts in heat maps 306 to implement crowd detection rules and queue detection rules. In an aspect, such rules may apply logical operators to one or more counts to identify an event. Below is an example of a crowd detection rule:

if den_est_predicted>threshold or (person_det_count is 0): return max(den_est_predicted, person_det_count)
else:
    return person_det_count,
    where den_est_predicted is count value for a particular sub-region 304 generated by a density estimation model, person_det_count is the corresponding count value for the same sub-region 304 generated by a person detection model and threshold is a predefined constant value. In an aspect, instead of applying rules, the analytics module 204 may use heat maps 306 as a multichannel input to a regression model/network that produces an overall estimate count.

Figure 4:
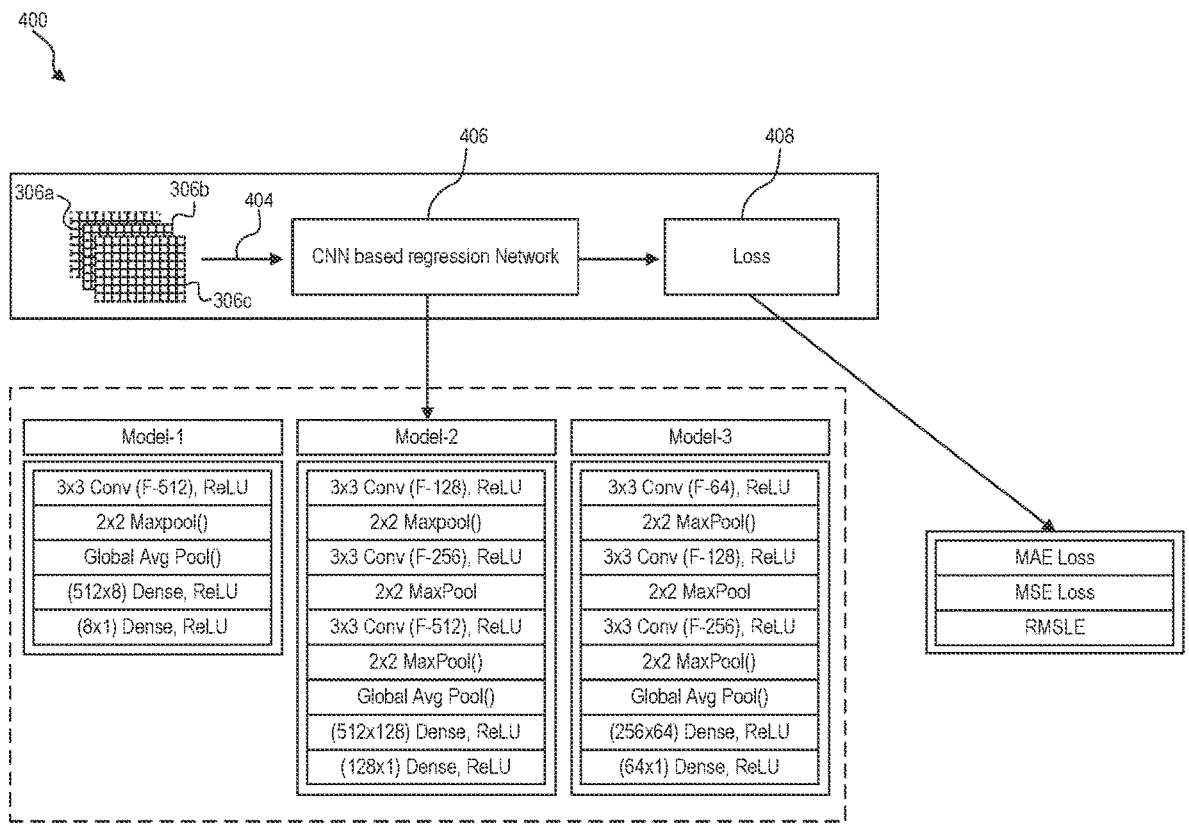
FIG. 4 shows an example architecture of a regression network in accordance with aspects of the present disclosure.

FIG. 4 shows an example architecture of a regression network in accordance with aspects of the present disclosure. As discussed above, the heat maps 306 may contain count values corresponding to different sub-regions 304 of the input image 302. Note that the analytics module 204 may take into account the fact that consecutive sub-regions 304 do not overlap, so that count values are calculated for each sub-region 304 separately. Also, as discussed above and as shown in FIG. 4, the count values (heat maps 306) may be obtained using the different CNN networks models. These heat maps may include, but are not limited to, a first heat map 306a generated by a first CNN network model that is employed for head detection, a second heat map 306b generated by a second CNN network model that is employed for person detection and a third heat map 306c generated by a third CNN network model that is employed for density estimation). The aforementioned CNN network models may be trained with three different datasets. In various aspects, the analytics module 204 may use more than 3 or less than 3 models. For example, the analytics module 204 may only employ the second heat map 306b and third heat map 306c as inputs to the CNN based regression network 406 illustrated in FIG. 4.

A three channel data 404 may be derived by the analytics module 204 from the CNN network models. FIG. 4 illustrates heat map data 404 having three input count values for each 32×32 sub-region 304 that are in 3 different heat maps 306a-306c, according to an exemplary aspect. This stacked multi-dimensional heat map 306a-306c may be fed by the analytics module 204 as an input to the CNN based regression network 406. In an aspect, the CNN based regression network 406 may be configured to adaptively perform deep learning from the counts obtained from 3 different heat maps 306a-306c (representing count values for each of subregions 304). The CNN based regression network model 406 may be built using machine learning techniques for solving regression problems, including techniques to minimize loss functions. In an aspect, the MAE (Mean Absolute Error) loss function 408 may be used for training the CNN based regression network model 406.

In an aspect, the analytics module 204 may perform crowd counting using the CNN based regression network model 406 by taking a point on the detected head as a label. Based on each label, the CNN based regression network model 406 may predict corresponding person count in a local window of the image 202. Finally, the CNN based regression model 406 may be configured to sum up the count values obtained for each window to get the total count of people in the input image 202. It should be noted that counting method employed by the CNN based regression model 406 is different from counting the entire body and/or counting head region that are employed by the first CNN network model and the second CNN network model.

Generally, regression models are more accurate in counting people in very dense regions of an image but not necessarily as accurate for sparse regions of the image. Since regression models typically are not using all the features of a person, the analytics module 204 only needs a few pixels for labeling each person, when regression models are employed. In other words, the analytics module 204 is capable of labeling all people detected in the image 202 and may train the CNN based regression model 406. As noted above, the regression models are accurate in counting very high dense regions. However, these models are also prone to over counting.

On the other hand, head detection models such as the first CNN network model may be trained to spatially resolve a head region of the image 202 with a two-dimensional rectangle representing location of the candidate human head in the image 202. In one example, the candidate human head may include a contiguous region of pixels each having a probability that is greater than a threshold of being a human head as classified by the first CNN network model.

Further, person detection models such as the second CNN network model may be trained to spatially resolve a human body region of the image 202 with a two-dimensional rectangle representing location of the candidate human body in the image 202. Accordingly, the head detection models and the person detection models are configured to analyze a specific area on the image 202 and may learn more distinguishing features of each detected person. The result of the analysis performed by the head detection models and the person detection models may include a classification of the detected objects into a category, e.g., person or non-person. These classification results are generally less susceptible to errors associated with false positives due to utilization of more distinguishing features of each detected person.

Therefore, the head detection models and the person detection models can return a more accurate classification where susceptibility to errors associated with the noted false positives is a concern. Furthermore, the head detection models and the person detection models may reduce the computational complexity by providing a filtered data set and selective features of a target object to a classifier for counting people. In general, the head detection models and the person detection models have good FP (False Positive) score and bad FN (False Negative) score, and regression models have good FN score and bad FP score. As used herein, the term "false positive" and the abbreviation "FP" refer to a positive detection of a person in an image (e.g., indicating the presence of a person in a particular area of an image) which corresponds to an actual negative (e.g., the absence of the person in the particular area of the image). False positives are positive results which are incorrectly identified and factually incorrect. As used herein, the term "false negative" and the abbreviation "FN" refer to a negative detection of a person in an image (e.g., indicating the absence of the person in a particular area of the image) which corresponds to an actual positive (e.g., the presence of a person in a particular area of an image). False negatives are negative results which are incorrectly identified and factually incorrect.

Advantageously, the CNN based regression model 406 provides trained local detectors that are used to learn in which portions of the input image 202 to use the results obtained by the person detection models, head detection models and density estimation models using a CNN network and adaptively obtain best results based on the local crowd context. In other words, the CNN based regression model 406 may assign weights to inputs (e.g., multi-dimensional heat maps 306a-306c). The weights can be applied to inputs to the layers that comprise the multilayered analysis engine. In some aspects, the weights may be assigned an initial value that may be updated during the training of the CNN based regression model 406, based on processes such as back-propagation. In aspects, the counting performed by the CNN based regression model 406 includes performing supervised learning as part of the training by using a set of images, that have been labeled for detected persons. In other aspects, the counting performed by the CNN based regression model 406 may include performing unsupervised learning as part of the training.

Figure 5:
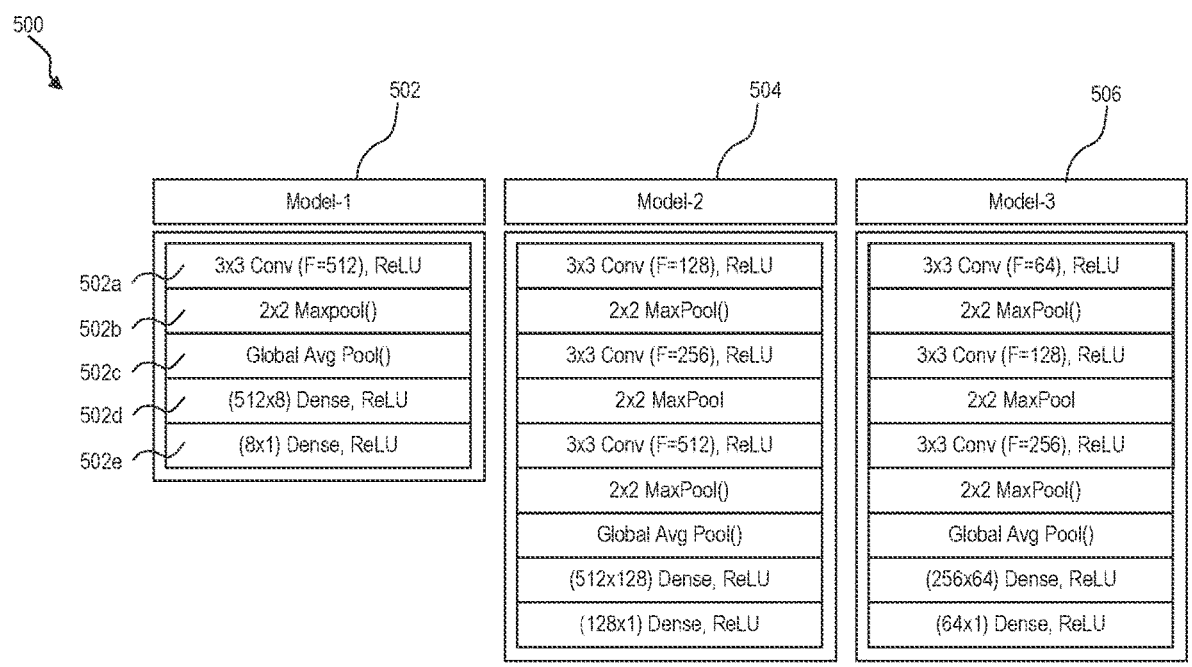
FIG. 5 shows examples of network structures of the regression network of FIG. 4 in accordance with aspects of the present disclosure.

FIG. 5 shows examples of network structures of the regression network of FIG. 4 in accordance with aspects of the present disclosure. More specifically, FIG. 5 illustrates three exemplary network structures 502-506.

The first network structure 502 may include a convolutional layer 502a containing 512 filters and a 3×3 kernel to extract features from the input patch and map them to the target patch. The convolution layer 502a may include a rectified linear unit (ReLU) to introduce non-linearity. The last layer may be a fully connected layer which computes the weighted sum of the output from the previous layer and gives a single value which is the estimate of person count.

The second layer 502b may comprise a reduction layer. A reduction layer provides for a data reduction in particular to avoid overfitting. One type of reduction layer is a pooling layer (MaxPool: n,m). A layer of this type provides for a data reduction by down sampling. In particular this type of layer down samples the data retrieved from its input raster by selecting the maximum value of the inputs on a window of n×m data elements. Typically the windows used for the MaxPool layer provide for a tiling of the input image, so that the windows are displaced with stride n in the first direction and with stride m in the second direction. This implies that the number of pixels is reduced by a factor n in the first direction and a factor m in the second direction. Accordingly, a reduction layer of type MaxPool: with m=2 and n=2 will partition the input raster into 2×2 windows and provide for a data reduction of 4:1.

The third layer 502c may be a Global Average Pooling layer. Global Average Pooling is a pooling operation designed to handle variable input image sizes. This layer 502c may be configured to generate one feature map for each corresponding category of the classification task in the last convolution layer. Instead of adding fully connected layers on top of the feature maps, Global Average Pooling layer takes the average of each feature map. Advantageously, global average pooling sums out the spatial information, thus it is more robust to spatial translations of the input.

As shown in FIG. 5, additional layers can then also be implemented. In an aspect, the last two layers 502d and 502e may be dense layers. As opposed to a convolutional layer, a "dense" layer is a fully connected layer. The size of the stride, kernel size, etc. are design parameters that can be selected through trial and error, empirical observations, etc.

It should be noted that other exemplary network structures 504 and 506 may include more than one convolution layer (for, example, three convolution layers). In these examples, each convolution layer contains different number of filters.

Figure 6:
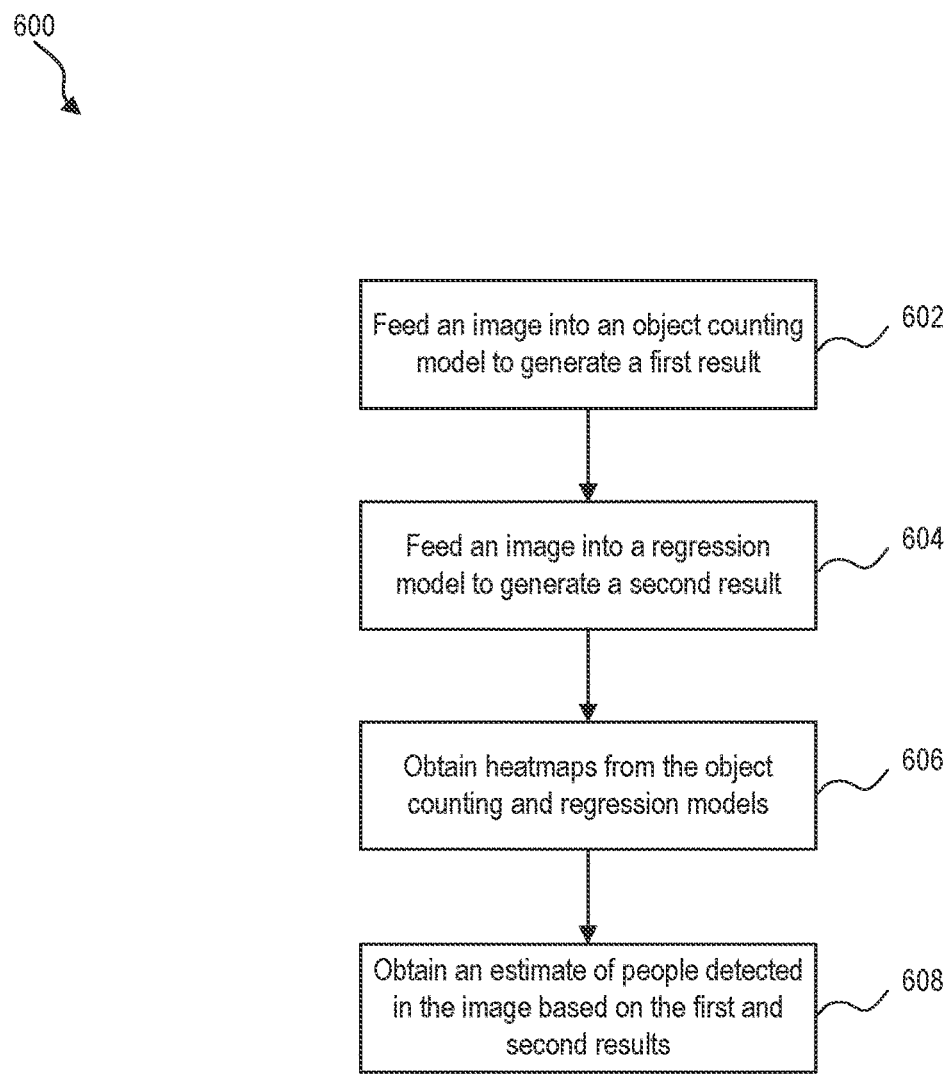
FIG. 6 is an example of a flowchart illustrating a method for counting number of people in an image, in accordance with aspects of the present disclosure

FIG. 6 is an example of a flowchart illustrating a method 600 for counting number of people in an image, in accordance with aspects of the present disclosure. FIGS. 1-5 may be referenced in combination with the flowchart of FIG. 6. At steps 602-604, the analytics module 204 may feed the input image 202 into one or more models.

More specifically, at step 602, the analytics module 204 may feed an image 202 into an object counting model to generate a first result. By way of example only, the object counting model may comprise the first CNN network model employed for head detection. The head detection models such as the first CNN network model may be trained to spatially resolve a head region of the image 202 with a two-dimensional rectangle representing location of the candidate human head in the image 202. In one example, the candidate human head may include a contiguous region of pixels each having a probability that is greater than a threshold of being a human head as classified by the first CNN network model 402a. CNNs share many properties with ordinary neural networks. For example, they both include neurons that have learnable weights and biases. Each node/neuron receives some inputs and performs a function that determines if the node/neuron "fires" and generates an output.

At step 604, the analytics module 204 may feed an image 202 into a density estimation model to generate a second result. By way of example only, the density estimation model may comprise the third CNN network model that may be used for regression counting. Generally, regression models are more accurate in counting people in very dense regions of an image but not necessarily as accurate for sparse regions of the image. Since regression models typically are not using all the features of a person, the analytics module 204 may use a few pixels for labeling each person, when regression models are employed. The training can include submitting multiple images to the third CNN model. In a supervised learning scenario, the third CNN model makes an estimate of a people count in the image 202 and compares the output to the human-coded assessment in the metadata. Various parameters such as weights between the layers can be adjusted until a majority of the input images are correctly classified and more accurate counts are provided by the third CNN model.

At step 606, the analytics module 204 may obtain a first heat map 306a from the object counting model (e.g., from the first CNN model) and a third heat map 306c from the density estimation model (e.g., from the third CNN model). In an aspect, the analytics module 204 may optionally utilize and a second heat map 306b as well. Each heat map 306 shown in FIG. 3 represents a corresponding extracted feature map. In an aspect, the analytics module 204 may generate an image heat map 306 having one of the following size types: fixed size and variable size. If the fixed size is utilized, the analytics module 204 may divide the input image 302 into N×N sub-regions 304 irrespective of the size of the input image 302. If variable size is utilized (for example, if the input image 302 has non-rectangular effective picture area), each element of the heat map 306 may use count values representing detections from each M×M pixel sub-regions 304.

At step 608, the analytics module 204 may obtain an estimate of people detected in the image based on the obtained heat maps 306. In an aspect, the analytics module 204 may obtain the estimate using one or more rules (e.g., a crowd detection rule) discussed above. In another aspect, the analytics module 204 may obtain the estimate from the CNN based regression model 406. CNN based approach introduces computational complexity. However, the CNN based regression model 406 provides trained local detectors that are used to learn in which portions of the input image 202 to use the results obtained by the person detection models, head detection models and regression results using a CNN network and adaptively obtain best results based on the local crowd context. In other words, the CNN based regression model 406 may assign weights to inputs (e.g., multi-dimensional heat map 306a-306c). The weights can be applied to inputs to the layers that comprise the multilayered analysis engine. In some aspects, the weights may be assigned an initial value that may be updated during the training of the CNN based regression model 406, based on processes such as backpropagation. In aspects, the counting performed by the CNN based regression model 406 includes performing supervised learning as part of the training by using a set of images, that have been labeled for detected persons. FIG. 5 shows examples of network structures of the regression network of FIG. 4 in accordance with aspects of the present disclosure. More specifically, FIG. 5 illustrates three exemplary network structures 502-506. For example, if the first network structure 502 is employed and the detection confidence levels are not sufficient, another network structure, with a larger number of layers may be employed, thus reducing (i.e., on average) the computational complexity (e.g., in terms of the number of operations performed).

In other words, a method 600 for counting number of people in an image includes feeding an image into an object counting model to generate a first result for the image that is indicative of a number of human heads detected in one or more regions of the image. The image is fed into a regression model to generate a second result for the image that is indicative of a regression count of people detected in the one or more regions of the image. An estimate of people detected in the image is obtained based on the first result and the second result using one or more rules.

In one or any combination of these aspects, the object counting model includes a first Convolutional Neural Network (CNN) model and the regression model includes a second CNN model.

In one or any combination of these aspects, the object counting model includes two or more CNN models.

In one or any combination of these aspects, the method further includes obtaining a first heat map from the first CNN model and second heat map from a second CNN model.

In one or any combination of these aspects, the estimate is obtained using a CNN based regression model.

In one or any combination of these aspects, the method further includes stacking the first heat map and the second heat map to form a multiple channel input for the CNN based regression model and feeding the multiple channel input into the CNN based regression model.

In one or any combination of these aspects, the CNN based regression model utilizes a Mean Absolute Error (MAE) loss function.

In one or any combination of these aspects, each of the first heat map and the second heat map has fixed size or variable size.

In one or any combination of these aspects, a cell of the fixed size CNN based regression model comprises 8×8 pixels.

In one or any combination of these aspects, the one or more rules are used to identify one or more events (e.g., detected crowd) in the image.

Figure 7:
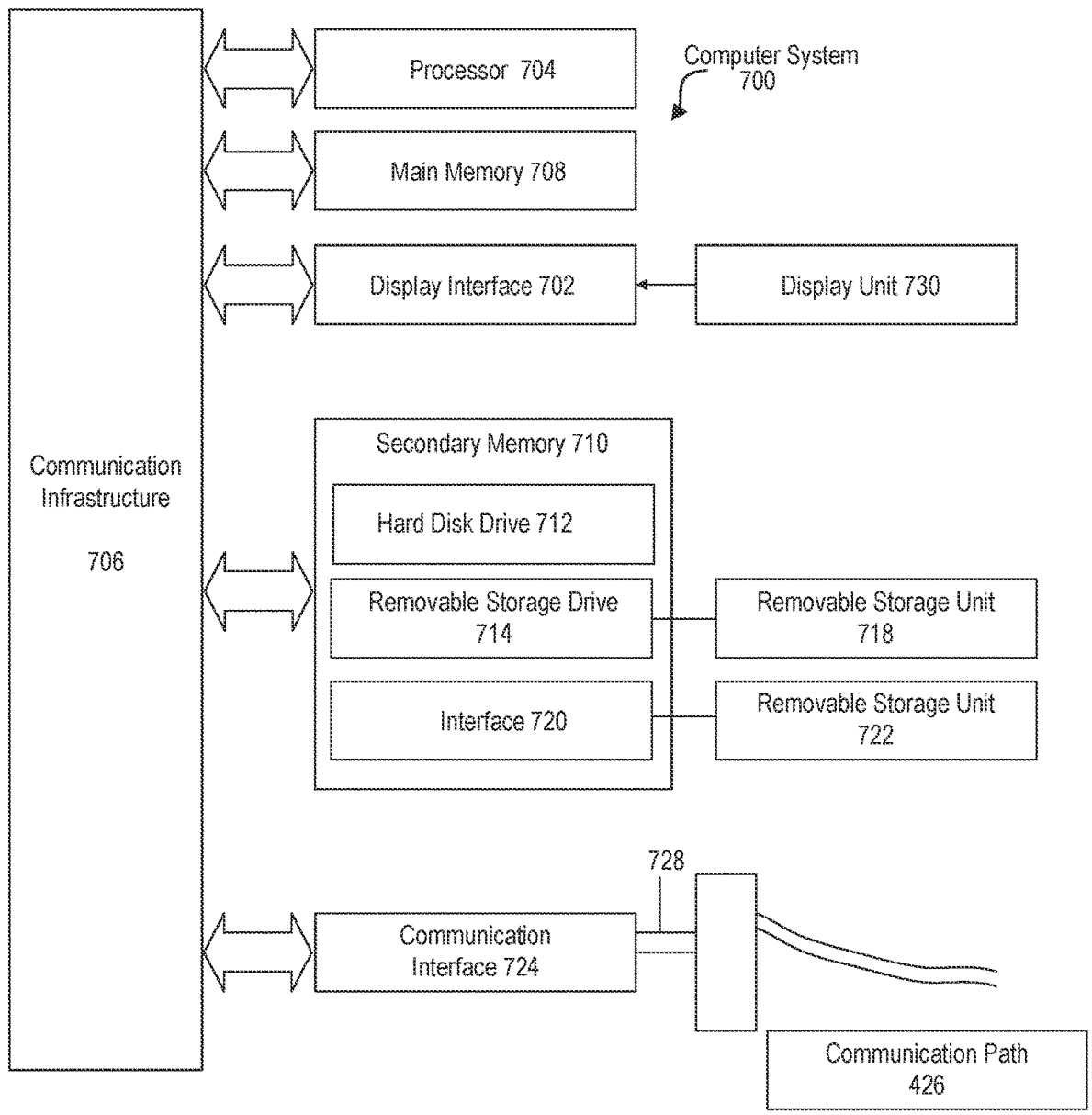
FIG. 7 is an example of a block diagram illustrating various hardware components and other features of the crowd-counting system in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 7 is an example of a block diagram illustrating various hardware components and other features of a computer system that may operate the local sensing device 102 in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 704, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 706, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 700, or any other type of connection between computer-related components described herein can be referred to an operable connection, and can include a connection by which entities are operably connected, such that signals, physical communications, and/or logical communications can be sent and/or received. An operable connection can include a physical interface, a data interface and/or an electrical interface.

Computer system 700 can include a display interface 702 that forwards graphics, text, and other data from the communication infrastructure 706 (or from a frame buffer not shown) for display on a display unit 730. Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 can include other similar devices for allowing computer programs or other instructions to be loaded into computer system 700. Such devices can include, for example, a removable storage unit 722 and an interface 720. Examples of such can include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

It should be understood that a memory, as used herein can include volatile memory and/or non-volatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 700 can also include a communications interface 724. Communications interface 724 allows software and data to be transferred between computer system 700 and external devices. Examples of communications interface 724 can include a modem, a network interface (such as an Ethernet card), a communications port, a Personal Computer Memory Card International Association (PCMCIA) slot and card, etc. Software and data transferred via communications interface 724 are in the form of signals 728, which can be electronic, electromagnetic, optical or other signals capable of being received by communications interface 724. These signals 728 are provided to communications interface 724 via a communications path (e.g., channel) 726. This path 726 carries signals 728 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs can also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software can be stored in a computer program product and loaded into computer system 700 using removable storage drive 714, hard drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for counting number of people in an image comprising:
    feeding the image into an object counting model to generate a first heat map for the image that is indicative of a number of human heads detected in one or more regions of the image;
    feeding the image into a regression model to generate a second heat map for the image that is indicative of a regression count of people detected in the one or more regions of the image; and
    obtaining an estimate of people detected in the image based on the first heat map and the second heat map using one or more rules, including stacking the first heat map and the second heat map to form a multiple channel input and feeding the multiple channel input into a Convolutional Neural Network (CNN) based regression model.

2. The method of claim 1, wherein the object counting model comprises a first CNN model and the regression model comprises a second CNN model.

3. The method of claim 2, wherein the object counting model comprises two or more CNN models.

4. The method of claim 1, wherein the CNN based regression model utilizes a Mean Absolute Error (MAE) loss function.

5. The method of claim 1, wherein each of the first heat map and the second heat map has a fixed size or a variable size.

6. The method of claim 5, wherein a cell of each fixed size CNN based regression model comprises 8×8 pixels.

7. The method of claim 5, wherein the one or more rules are used to identify one or more events in the image.

8. A system for counting number of people in an image comprising:
    a hardware processor configured to:
        feed the image into an object counting model to generate a first heat map for the image that is indicative of a number of human heads detected in one or more regions of the image;
        feed the image into a regression model to generate a second heat map for the image that is indicative of a regression count of people detected in the one or more regions of the image; and
        obtain an estimate of people detected in the image based on the first heat map and the second heat map using one or more rules, including stacking the first heat map and the second heat map to form a multiple channel input and feeding the multiple channel input into a Convolutional Neural Network (CNN) based regression model.

9. The system of claim 8, wherein the object counting model comprises a first CNN model and the regression model comprises a second CNN model.

10. The system of claim 9, wherein the object counting model comprises two or more CNN models.

11. The system of claim 8, wherein the CNN based regression model utilizes a Mean Absolute Error (MAE) loss function.

12. The system of claim 8, wherein each of the first heat map and the second heat map has a fixed size or a variable size.

13. The system of claim 12, wherein a cell of each fixed size CNN based regression model comprises 8×8 pixels.

14. The system of claim 12, wherein the one or more rules are used to identify one or more events in the image.

* * * * *